(12) United States Patent
Dong et al.

(10) Patent No.: US 12,038,586 B2
(45) Date of Patent: Jul. 16, 2024

(54) OPTICAL DEVICE AND NEAR-EYE DISPLAY APPARATUS

(71) Applicants: Beijing BOE Optoelectronics Technology Co., Ltd., Beijing (CN); BOE Technology Group Co., Ltd., Beijing (CN)

(72) Inventors: Ruijun Dong, Beijing (CN); Yali Liu, Beijing (CN); Chenru Wang, Beijing (CN); Ke Li, Beijing (CN); Hao Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 65 days.

(21) Appl. No.: 17/992,416

(22) Filed: Nov. 22, 2022

(65) Prior Publication Data

US 2023/0084364 A1      Mar. 16, 2023

Related U.S. Application Data

(63) Continuation of application No. 16/766,464, filed as application No. PCT/CN2019/125187 on Dec. 13, 2019, now Pat. No. 11,592,671.

(30) Foreign Application Priority Data

Feb. 28, 2019  (CN) .......................... 201910152310.8

(51) Int. Cl.
*G02B 27/01* (2006.01)
*G02B 13/00* (2006.01)
*G02B 27/12* (2006.01)

(52) U.S. Cl.
CPC ........ *G02B 27/0172* (2013.01); *G02B 13/002* (2013.01); *G02B 2027/0178* (2013.01); *G02B 27/126* (2013.01)

(58) Field of Classification Search
CPC .............. G02B 27/017; G02B 27/0172; G02B 27/0176; G02B 2027/0178
See application file for complete search history.

(56) References Cited

U.S. PATENT DOCUMENTS 5,383,053 A * 1/1995 Hegg ................. G02B 27/0101
                                              359/485.05
5,886,823 A * 3/1999 Sugano .............. G02B 27/0018
                                              359/630

(Continued)

FOREIGN PATENT DOCUMENTS

CN         101900872 A       12/2010
CN         104414747 A        3/2015

(Continued)

OTHER PUBLICATIONS

Dec. 24, 2020—(CN) First Office Action Appn 201910152310.8 with English Translation.

(Continued)

*Primary Examiner* — Bao-Luan Q Le
(74) *Attorney, Agent, or Firm* — Banner & Witcoff, Ltd.

(57) ABSTRACT

A near-eye display apparatus is disclosed. The near-eye display apparatus includes a lens and an optical path folding assembly. The lens is configured to receive incident light of a first image, which is projected by a micro-display, and shape the first image; the lens includes a primary optical axis and a first lens face and a second lens face which are opposed in a first direction where the primary optical axis of the lens is positioned, a curvature radius of the first lens face is within a range of 70 to 100 millimeters, and a curvature radius of the second lens face is within a range of 10 to 30

(Continued)

millimeters; and the optical path folding assembly is configured to receive light of the first image shaped by the lens and fold an optical path from the lens to an exit pupil of the near-eye display apparatus.

20 Claims, 4 Drawing Sheets

(56) References Cited

U.S. PATENT DOCUMENTS

| | | | | |
|---|---|---|---|---|
| 6,201,646 | B1* | 3/2001 | Togino | G02B 17/0848 |
| | | | | 359/629 |
| 6,310,736 | B1* | 10/2001 | Togino | G02B 27/0172 |
| | | | | 359/834 |
| 6,384,983 | B1* | 5/2002 | Yamazaki | G02B 27/0172 |
| | | | | 359/837 |
| 7,081,999 | B2* | 7/2006 | Yamazaki | G02B 27/0172 |
| | | | | 359/633 |
| 8,873,149 | B2* | 10/2014 | Bohn | G02B 27/0172 |
| | | | | 359/633 |
| 8,964,298 | B2* | 2/2015 | Haddick | G02B 27/017 |
| | | | | 359/630 |
| 9,042,026 | B2* | 5/2015 | Choi | G02B 27/0172 |
| | | | | 359/651 |
| 9,874,760 | B2* | 1/2018 | Hua | G02B 30/22 |
| 10,194,860 | B2 | 2/2019 | Wang et al. | |
| 10,394,036 | B2* | 8/2019 | Hua | G02B 27/106 |
| 10,852,540 | B2* | 12/2020 | Osterhout | G06F 3/017 |
| 11,867,906 | B2* | 1/2024 | Xiao | G02B 27/283 |
| 2002/0060851 | A1* | 5/2002 | Yamazaki | G02B 27/0172 |
| | | | | 359/632 |
| 2013/0127980 | A1* | 5/2013 | Haddick | G06F 3/013 |
| | | | | 348/14.08 |
| 2014/0211322 | A1* | 7/2014 | Bohn | G02B 27/0081 |
| | | | | 359/633 |
| 2014/0268354 | A1* | 9/2014 | Choi | G02B 27/0172 |
| | | | | 359/630 |
| 2015/0277129 | A1* | 10/2015 | Hua | G02B 27/106 |
| | | | | 359/462 |
| 2015/0301336 | A1* | 10/2015 | Denefle | G02B 27/0172 |
| | | | | 359/488.01 |
| 2018/0107009 | A1* | 4/2018 | Hua | G02B 17/086 |
| 2019/0025587 | A1* | 1/2019 | Osterhout | G06F 1/163 |
| 2020/0371362 | A1* | 11/2020 | Xiao | G02B 27/283 |
| 2021/0405354 | A1 | 12/2021 | Liu et al. | |

FOREIGN PATENT DOCUMENTS

| | | |
|---|---|---|
| CN | 206805009 U | 12/2017 |
| CN | 207133516 U | 3/2018 |
| CN | 108333748 A | 7/2018 |
| CN | 207851337 U | 9/2018 |
| CN | 208126018 U | 11/2018 |
| CN | 208384244 U | 1/2019 |
| EP | 0704739 A3 | 11/1996 |
| JP | H0643397 A | 2/1994 |

OTHER PUBLICATIONS

Mar. 3, 2022—(US) Non-Final Office Action U.S. Appl. No. 16/766,464.

Feb. 28, 2020 (WO) International Search Report Appn PCT/CN2019/125187.

Jul. 21, 2022—(US) Final Office Action U.S. Appl. No. 16/766,464.

* cited by examiner

OPTICAL DEVICE AND NEAR-EYE DISPLAY APPARATUS

CROSS-REFERENCE TO RELATED APPLICATION

This application is a continuation of U.S. patent application Ser. No. 16/766,464, filed on May 22, 2020, which is a U.S. National Phase Entry of International Application No. PCT/CN2019/125187 filed on Dec. 13, 2019, designating the United States of America and claiming priority to Chinese Patent Application No. 201910152310.8, filed on Feb. 28, 2019. The present application claims priority to and the benefit of the above-identified applications and the above-identified applications are incorporated by reference herein in their entirety.

TECHNICAL FIELD

Embodiments of the present disclosure relate to a near-eye display apparatus.

BACKGROUND

An Augmented Reality (AR) display apparatus can implement fusion of an outside real scene and a virtual scene by superposing a virtual scene image displayed by the AR display apparatus into the outside real scene. Therefore, the AR display apparatus can promote a user's cognitive ability of the real world, thereby improving user experience.

SUMMARY

An embodiment of the present disclosure provides a near-eye display apparatus, comprising a lens and an optical path folding assembly; the lens is configured to receive incident light of a first image, which is projected by a micro-display, and shape the first image; the lens includes a primary optical axis and a first lens face and a second lens face which are opposed in a first direction where the primary optical axis of the lens is positioned, and both the first lens face and the second lens face are aspheric surfaces; and the optical path folding assembly is configured to receive light of the first image shaped by the lens and fold an optical path from the lens to an exit pupil of the near-eye display apparatus.

For example, in at least an example of the near-eye display apparatus, the optical path folding assembly includes a first transmission reflection element and a second transmission reflection element which are opposed in a second direction intersecting with the first direction, the light of the first image is sequentially reflected by the first transmission reflection element, reflected by the second transmission reflection element and transmitted by the first transmission reflection element.

For example, in at least an example of the near-eye display apparatus, the first transmission reflection element is a specular transmission reflection element.

For example, in at least an example of the near-eye display apparatus, the second transmission reflection element is a curved transmission reflection element, and a curved surface of the second transmission reflection element, which faces the exit pupil of the near-eye display apparatus, is a concave curved surface.

For example, in at least an example of the near-eye display apparatus, a primary optical axis of the second transmission reflection element is in parallel with the second direction; the primary optical axis of the lens intersects with the primary optical axis of the second transmission reflection element on a specular reflection surface of the first transmission reflection element; and an included angle between the specular reflection surface of the first transmission reflection element and the first direction is equal to 45 degrees.

For example, in at least an example of the near-eye display apparatus, the first transmission reflection element is a polarization beam splitting element.

For example, in at least an example of the near-eye display apparatus, the near-eye display apparatus further comprises a quarter-wave plate, the quarter-wave plate is arranged between the first transmission reflection element and the second transmission reflection element in the second direction, and the light of the first image is sequentially reflected by the first transmission reflection element, transmitted by the quarter-wave plate, reflected by the second transmission reflection element, transmitted by the quarter-wave plate, and transmitted by the first transmission reflection element.

For example, in at least an example of the near-eye display apparatus, the first direction is perpendicular to the second direction, and the second direction is perpendicular to the quarter-wave plate.

For example, in at least an example of the near-eye display apparatus, an intersection of an extension line of the first transmission reflection element and an extension line of the second transmission reflection element is positioned in a plane where the quarter-wave plate is positioned.

For example, in at least an example of the near-eye display apparatus, the near-eye display apparatus further comprises: a polarizer, which is positioned on a light incident side or a light emergent side of the lens in the first direction, wherein the polarizer is configured to enable polarized light emerging from the polarizer to be s-polarized light; and the polarization beam splitting element is configured to reflect the s-polarized light.

For example, in at least an example of the near-eye display apparatus, reflectivity of the first transmission reflection element and reflectivity of the second transmission reflection element are greater than or equal to 50%.

For example, in at least an example of the near-eye display apparatus, compared to the second lens face, the first lens face is closer to the micro-display; and a curvature radius of the first lens face is greater than a curvature radius of the second lens face.

For example, in at least an example of the near-eye display apparatus, both the first lens face and the second lens face are even-order aspheric surfaces; a surface shape z of the first lens face of the lens meets an expression (1) as follows:

$$z1 = \frac{c1 \times r1^2}{1 + \sqrt{1 - (1+k1) \times c1 \times r1^2}} + \\ a11 \times r1^2 + a12 \times r1^4 + a13 \times r1^6 + a14 \times r1^8 + a15 \times r1^{10}, ; \tag{1}$$

a surface shape z of the second lens face of the lens meets an expression (2) as follows:

$$z2 = \frac{c2 \times r2^2}{1 + \sqrt{1 - (1+k2) \times c2 \times r2^2}} + \\ a21 \times r2^2 + a22 \times r2^4 + a23 \times r2^6 + a24 \times r2^8 + a25 \times r2^{10}, ; \tag{2}$$

z1 represents an axial spacing of any one random point on the first lens face with respect to a tangent plane of a vertex of the first lens face; r1 represents a radial distance of any one random point on the first lens face with respect to the primary optical axis of the lens; c1 represents a curvature of the first lens face, and k1 represents a cone coefficient of the first lens face; a11, a12, a13, a14 and a15 respectively represent a second-order aspheric coefficient, a fourth-order aspheric coefficient, a sixth-order aspheric coefficient, an eighth-order aspheric coefficient and a tenth-order aspheric coefficient of the first lens face; and z2 represents an axial spacing of any one random point on the second lens face with respect to a tangent plane of a vertex of the second lens face; r2 represents a radial distance of any one random point on the second lens face with respect to the primary optical axis of the lens; c2 represents a curvature of the second lens face, and k2 represents a cone coefficient of the second lens face; and a21, a22, a23, a24 and a25 respectively represent a second-order aspheric coefficient, a fourth-order aspheric coefficient, a sixth-order aspheric coefficient, an eighth-order aspheric coefficient and a tenth-order aspheric coefficient of the second lens face.

For example, in at least an example of the near-eye display apparatus, a11, a12, a13, a14 and a15 respectively meet ranges as follows:

$-0.9 \times 10^{-4} < a11 < 1 \times 10^{-4}$
$-10 \times 10^{-3} < a12 < -1 \times 10^{-3}$
$1 \times 10^{-5} < a13 < 10 \times 10^{-5}$
$-10 \times 10^{-9} < a14 < -1 \times 10^{-9}$
$-10 \times 10^{-10} < a15 < -1 \times 10^{-10}$; and a21, a22, a23, a24 and a25 respectively meet ranges as below:

$-0.9 \times 10^{-4} < a21 < 1 \times 10^{-4}$
$-1 \times 10^{-4} < a22 < 10 \times 10^{-4}$
$-10 \times 10^{-6} < a23 < -1 \times 10^{-6}$
$-10 \times 10^{-7} < a24 < -1 \times 10^{-7}$
$1 \times 10^{-10} < a25 < 10 \times 10^{-10}$.

For example, in at least an example of the near-eye display apparatus, the near-eye display apparatus further comprises a micro-display, and the micro-display is configured to project incident light of the first image towards the lens.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Inventors of the present disclosure note that a current AR near-eye display apparatus is relatively large in size and weight, relatively low in light utilization efficiency (i.e., relatively high power consumption) and relatively small in field of view (FOV), which is contrary to demands and desires of consumers for the near-eye display apparatus and is difficult for the consumers to wear the near-eye display apparatus in daily life.

At least one embodiment of the present disclosure provides a near-eye display apparatus. The near-eye display apparatus includes a lens and an optical path folding assembly. The lens is configured to receive incident light of a first image, which is projected by a micro-display, and shape the first image; the lens includes a primary optical axis and a first lens face and a second lens face which are opposed in a first direction where the primary optical axis of the lens is positioned, and both the first lens face and the second lens face are aspheric surfaces; and the optical path folding assembly is configured to receive light of the first image shaped by the lens and fold an optical path from the lens to an exit pupil of the near-eye display apparatus.

It should be noted that in at least one embodiment of the present disclosure, the exit pupil of the near-eye display apparatus is an image formed by an aperture diaphragm of the near-eye display apparatus in an image space of the near-eye display apparatus. For example, the aperture diaphragm of the near-eye display apparatus refers to an effective aperture for limiting an emergent beam in the near-eye display apparatus. A position (which is represented by an exit pupil distance) and a diameter (which is represented by an exit pupil diameter) of the exit pupil represent a position and a caliber of the emergent beam. For example, when the near-eye display apparatus is in use, a pupil of a user can be positioned at the exit pupil of the near-eye display apparatus, so that the user can observe the overall FOV of the near-eye display apparatus. For example, in at least one embodiment of the present disclosure, the exit pupil of the near-eye display apparatus and the aperture diaphragm of the near-eye display apparatus coincide with each other.

It should be noted that in at least one embodiment of the present disclosure, a curvature radius from the center of the first lens face to the edge of the first lens face is a non-constant value (for example, it continuously changes). For example, the curvature radius of the center of the first lens face is smaller than that of the edge of the first lens face; and a curvature radius from the center of the second lens face to the edge of the second lens face is a non-constant value (for example, it continuously changes). For example, the curvature radius of the center of the second lens face is smaller than the curvature radius of the edge of the second lens face.

In some examples, by adopting the bi-aspherical lens, compared to the case of adopting a spherical lens to also shape the first image, imaging quality of the near-eye display apparatus can be improved, and the thickness of the near-eye display apparatus can be reduced.

In some examples, by adopting the bi-aspherical lens to promote image quality of the near-eye display apparatus, the volume of the near-eye display apparatus can be improved to the greatest extent, so that user experience can be promoted.

Figure 1:
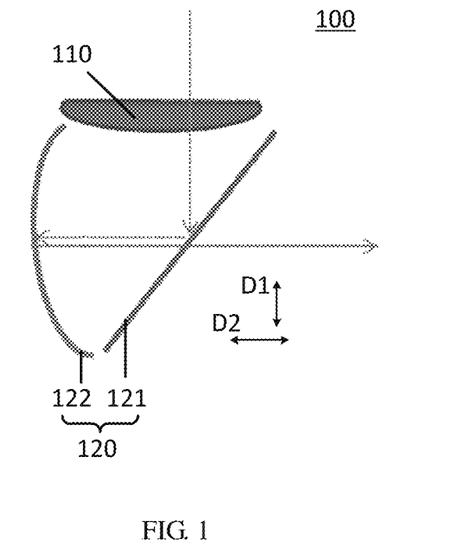
FIG. 1 is a structural schematic diagram of a near-eye display apparatus provided by at least one embodiment of the present disclosure.
Figure 2:
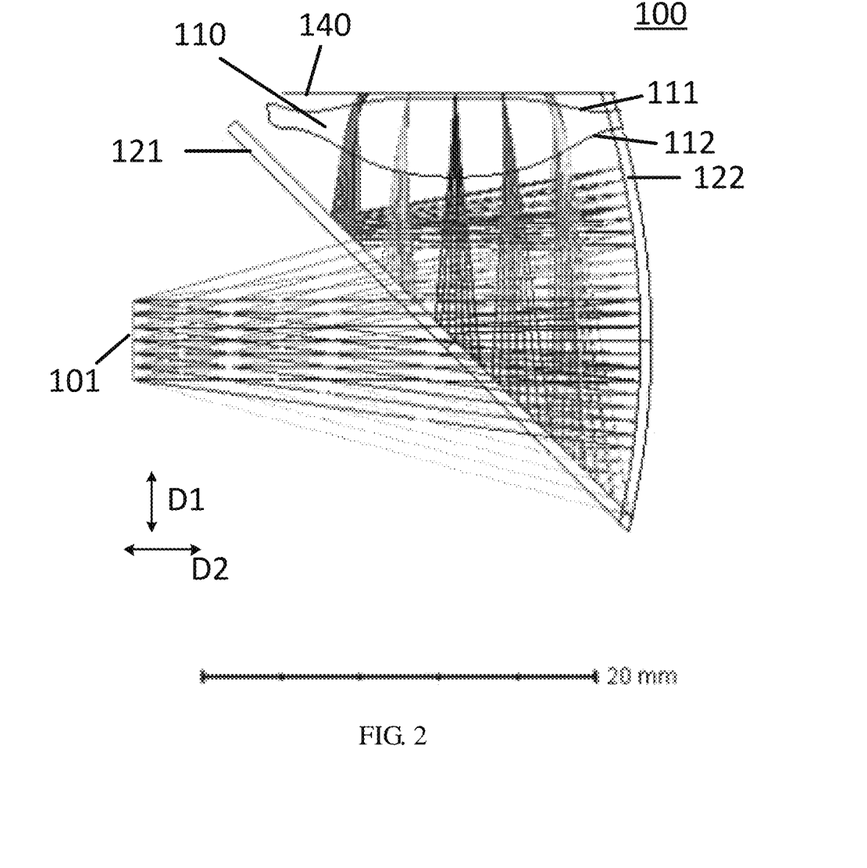
FIG. 2 is a schematic diagram of a light path of the near-eye display apparatus shown in FIG. 1.

FIG. 1 is a structural schematic diagram of a near-eye display apparatus 100 provided by at least one embodiment of the present disclosure, and FIG. 2 is a schematic diagram of a light path of the near-eye display apparatus 100 shown in FIG. 1. It should be noted that FIG. 2 shows a diagram of the near-eye display apparatus 100, which is drawn in an equal proportion on the basis of a proportional scale at the lower part of FIG. 2; and in order to facilitate description, FIG. 2 also shows a micro-display 140.

The near-eye display apparatus 100 shown in FIG. 1 and FIG. 2 can be implemented as monocular virtual reality glasses or binocular virtual reality glasses, and the near-eye display apparatus 100 shown in FIG. 1 and FIG. 2 also can be implemented as a virtual reality helmet or other applicable virtual reality display apparatuses.

As shown in FIG. 1, the near-eye display apparatus 100 includes a lens 110 and an optical path folding assembly 120. According to the actual application demands, as shown in FIG. 2, the near-eye display apparatus 100 further includes the micro-display 140. For example, the composite structure of the lens 110 and the optical path folding assembly 120 can be called as a turn-back type optical system.

Herein, a micro-display refers to a display of which a diagonal length is smaller than 2 inches (about 5 centimeters). For example, a size of the micro-display 140 provided by at least one embodiment of the present disclosure is between 0.5 inch and 1 inch, and for example, the size of the micro-display 140 is 0.7 inch or 0.8 inch. For example, the micro-display 140 can be implemented on the basis of a Micro Organic Light-Emitting Diode (Micro OLED) technology, a Micro Light-Emitting Diode (Micro-LED) technology, a holographic display technology, a Liquid Crystal on Silicon (LCoS) technology, a Digital Light Processing (DLP) technology or other applicable micro-display device technologies.

As shown in FIG. 2, the micro-display 140 is configured to project incident light of a first image towards the lens 110. For example, an image displayed by the micro-display 140 is used as an "object" of the near-eye display apparatus 100, and the image displayed by the micro-display 140 is positioned in the same plane, i.e., a curvature radius of the "object" of the near-eye display apparatus 100 is infinitely great. For example, in one exemplary example, a size (a diagonal length of the image displayed by the micro-display 140) of the image displayed by the micro-display 140 is 17.682 millimeters.

As shown in FIG. 2, the lens 110 is configured to receive the incident light of the first image, which is projected by the micro-display 140, and shape the first image (for example, magnify the first image) so as to obtain a display image suitable to pass through the subsequent optical path folding assembly 120 to be shown to a user. In some examples, the lens 110 is configured to magnify the first image into an image suitable for human eyes to observe; in some other examples, the lens 110 cooperates with the optical path folding assembly 120 mutually to magnify the first image into the image suitable for the human eyes to observe (or, an image for display); and in yet some examples, the lens 110 is also configured to regulate a shape of the first image to make the image suitable for the human eyes to observer so as to reduce a distortion of the image. For example, the distortion of the image suitable for the human eyes to observe (or, the image for display) is small (for example, the image has no distortion).

As shown in FIG. 1 and FIG. 2, the lens 110 includes a primary optical axis (not shown) and a first lens face 111 and a second lens face 112 which are opposed in a first direction D1 where the primary optical axis of the lens 110 is positioned, and compared to the second lens face 112, the first lens face 111 is closer to the micro-display 140. It should be noted that the primary optical axis of the lens 110 refers to a straight line (a virtual straight line) passing through the center (the sphere center) of the first lens face 111 and the center (the sphere center) of the second lens face 112.

As shown in FIG. 1 and FIG. 2, both the first lens face 111 and the second lens face 112 are aspheric surfaces, i.e., the lens 110 provided by at least one embodiment of the present disclosure is a bi-aspherical lens. For example, the first lens face 111 and the second lens face 112 select the aspheric surfaces to shape (for example, magnify) the first image so as to obtain the display image suitable to pass through the subsequent optical path folding assembly 120 to be shown to the user, and compared to the case of adopting the spherical lens to also shape the first image, the imaging quality of the near-eye display apparatus can be improved, and the thickness of the near-eye display apparatus can be reduced. For example, by setting the lens 110 as the bi-aspherical lens, the imaging quality of the near-eye display apparatus 100 can be promoted in the case of not adopting a free-form lens (or other lenses adopting advanced curved surfaces), and thus, the manufacturing difficulty and the manufacturing cost of the lens 110 can be reduced.

As shown in FIG. 1 and FIG. 2, the first lens face 111 and the second lens face 112 are concave curved surfaces which are convex towards opposite directions, and thus, the lens 110 is a convex lens (for example, a biconvex lens). For example, the first lens face 111 is a convex curved surface which is convex towards the micro-display 140, and the second lens face 112 is a convex curved surface which is convex away from the micro-display 140.

For example, by adopting the bi-aspherical lens to promote the image quality of the near-eye display apparatus 100, the volume of the near-eye display apparatus 100 can be reduced by optimizing the optical path folding assembly 120, so that user experience can be promoted.

The specific structure and parameters of the lens 110 will be exemplarily illustrated below.

For example, the first lens face 111 is an even-order aspheric surface. For example, a surface shape of the first lens face 111 of the lens 110 meets an expression as follows:

$$z1 = \frac{c1 \times r1^2}{1+\sqrt{1-(1+k1) \times c1 \times r1^2}} + a11 \times r1^2 + a12 \times r1^4 + a13 \times r1^6 + a14 \times r1^8 + a15 \times r1^{10},$$

where z1 represents an axial spacing of any one random point on the first lens face 111 with respect to a tangent plane of a vertex of the first lens face 111; r1 represents a radial distance of any one random point on the first lens face 111 with respect to the primary optical axis of the lens 110; c1 represents a curvature of the first lens face 111, and k1 represents a cone coefficient of the first lens face 111; and a11, a12, a13, a14 and a15 respectively represent a second-order aspheric coefficient, a fourth-order aspheric coefficient, a sixth-order aspheric coefficient, an eighth-order aspheric coefficient and a tenth-order aspheric coefficient of the first lens face 111.

For example, the second lens face 112 is an even-order aspheric surface. For example, a surface shape z2 of the second lens face 112 of the lens 110 meets an expression as follows:

$$z2 = \frac{c2 \times r2^2}{1+\sqrt{1-(1+k2) \times c2 \times r2^2}} + a21 \times r2^2 + a22 \times r2^4 + a23 \times r2^6 + a24 \times r2^8 + a25 \times r2^{10},$$

where z2 represents an axial spacing of any one random point on the second lens face 112 with respect to a tangent plane of a vertex of the second lens face 112; r2 represents a radial distance of any one random point on the second lens face 112 with respect to the primary optical axis of the lens 110; c2 represents a curvature of the second lens face 112, and k2 represents a cone coefficient of the second lens face 112; and a21, a22, a23, a24 and a25 respectively represent a second-order aspheric coefficient, a fourth-order aspheric coefficient, a sixth-order aspheric coefficient, an eighth-order aspheric coefficient and a tenth-order aspheric coefficient of the second lens face 112.

For example, a11, a12, a13, a14 and a15 respectively meet ranges as follows:
$-0.9 \times 10^{-4} < a11 < 1 \times 10^{-4}$
$-10 \times 10^{-3} < a12 < -1 \times 10^{-3}$
$1 \times 10^{-5} < a13 < 10 \times 10^{-5}$.
$-10 \times 10^{-9} < a14 < -1 \times 10^{-9}$
$-10 \times 10^{-10} < a15 < -1 \times 10^{-10}$ For example, a21, a22, a23, a24 and a25 respectively meet ranges as follows:
$-0.9 \times 10^{-4} < a21 < 1 \times 10^{-4}$
$1 \times 10^{-4} < a22 < 10 \times 10^{-4}$
$-10 \times 10^{-6} < a23 < -1 \times 10^{-6}$.
$-10 \times 10^{-7} < a24 < -1 \times 10^{-7}$
$1 \times 10^{-10} < a25 < 10 \times 10^{-10}$ In one example, a11, a12, a13, a14, a15, a21, a22, a23, a24 and a25 can adopt values in Table 1 below.

TABLE 1

| a11 | a12 | a13 | a14 | a15 |
|---|---|---|---|---|
| 0 | $-1.014 \times 10^{-3}$ | $1.384 \times 10^{-5}$ | $-4.658 \times 10^{-9}$ | $-4.363 \times 10^{-10}$ |
| a21 | a22 | a23 | a24 | a25 |
| 0 | $5.456 \times 10^{-4}$ | $-3.086 \times 10^{-6}$ | $-1.498 \times 10^{-7}$ | $9.868 \times 10^{-10}$ |

In another example, a11, a12, a13, a14, a15, a21, a22, a23, a24 and a25 also can adopt values in Table 2 below.

TABLE 2

| a11 | a12 | a13 | a14 | a15 |
|---|---|---|---|---|
| 0 | $-5.014 \times 10^{-3}$ | $1.784 \times 10^{-5}$ | $-4.656 \times 10^{-9}$ | $-1.363 \times 10^{-10}$ |
| a21 | a22 | a23 | a24 | a25 |
| 0 | $3.456 \times 10^{-4}$ | $-1.086 \times 10^{-6}$ | $-5.498 \times 10^{-7}$ | $7.868 \times 10^{-10}$ |

In yet another example, a11, a12, a13, a14, a15, a21, a22, a23, a24 and a25 also can adopt values in Table 3 below.

TABLE 3

| a11 | a12 | a13 | a14 | a15 |
|---|---|---|---|---|
| 0.001 | $-4.014 \times 10^{-3}$ | $2.384 \times 10^{-5}$ | $-4.668 \times 10^{-9}$ | $-4.363 \times 10^{-10}$ |
| a21 | a22 | a23 | a24 | a25 |
| 0.001 | $3.456 \times 10^{-4}$ | $-1.086 \times 10^{-6}$ | $-1.468 \times 10^{-7}$ | $9.868 \times 10^{-10}$ |

Figure 3:
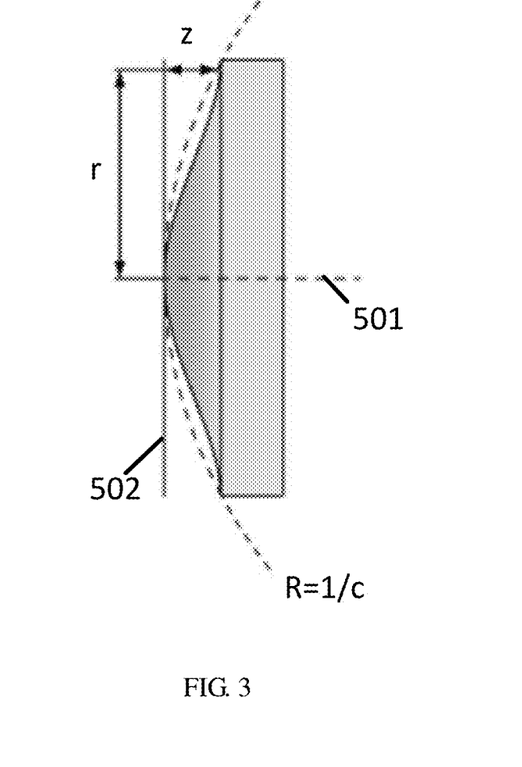
FIG. 3 is an aspheric lens.

In order to understand each parameter of the first lens face 111 and the second lens face 112 of the lens 110 more clearly, an aspheric lens 110 and related parameters will be exemplarily illustrated below in connection with an aspheric lens shown in FIG. 3. As shown in FIG. 3, the aspheric lens 110 includes a primary optical axis 501 and an aspheric lens face. A surface shape of the aspheric lens face meets an expression as follows:

$$z = \frac{c \times r^2}{1+\sqrt{1-(1+k) \times c \times r^2}} + a1 \times r^2 + a2 \times r^4 + a3 \times r^6 + a4 \times r^8 + a5 \times r^{10},$$

where z represents an axial spacing of any one random point on the aspheric lens face, i.e., a spacing (a spacing along a direction of the primary optical axis 501) between one random point on the aspheric lens face and a tangent plane 502 of a vertex of the aspheric lens face; r represents a radial direction of any one random point on the aspheric lens face with respect to the primary optical axis 501 (i.e., a spacing between one random point on the aspheric lens face and the primary optical axis 501 along a direction perpendicular to the primary optical axis 501); c represents a curvature of the aspheric lens face, R represents a curvature radius of the aspheric lens face, and k represents a cone coefficient of the aspheric lens face; and a1, a2, a3, a4 and a5 respectively represent a second-order aspheric coefficient, a fourth-order aspheric coefficient, a sixth-order aspheric coefficient, an eighth-order aspheric coefficient and a tenth-order aspheric coefficient of the aspheric lens face. Combination of the axial spacing and the radial distance of each point on the aspheric lens face can be used for showing the surface shape of the aspheric lens face.

It should be noted that in at least one example of the present disclosure, the curvature radius R of the aspheric lens face refers to a curvature radius of the vertex of the aspheric lens face.

For example, a material of the lens 110 provided by the embodiments of the present disclosure can be selected according to actual application demands. For example, the material of the lens 110 provided by the embodiments of the present disclosure may be optical plastic, optical glass or other applicable materials.

For example, as shown in FIG. 1 and FIG. 2, a curvature radius (for example, a curvature radius of a vertex of the first lens face 111) of the first lens face 111 is greater than a curvature radius (for example, a curvature radius of a vertex of the second lens face 112) of the second lens face 112. For example, a ratio of the curvature radius of the first lens face 111 to the curvature radius of the second lens face 112 is within a range of 4 to 6. For example, the curvature radius of the first lens face 111 can be within a range of 70 to 100 millimeters. For example, any one of the following values can be selected as the radius of the first lens face 111: 70.167 millimeters, 80.539 millimeters, 85.281 millimeters, 88.761 millimeters, 90.954 millimeters and 94.827 millimeters. For example, the curvature radius of the second lens face 112 can be within a range of 10 to 30 millimeters. For example, any one of the following values can be selected as the radius of the second lens face 112: 10.063 millimeters, 16.891 millimeters, 18.075 millimeters, 19.3984 millimeters, 20.532 millimeters, 25.113 millimeters and 29.084 millimeters.

For example, a clear aperture (a diameter) of the first lens face 111 is slightly smaller than a clear aperture (a diameter) of the second lens face 112. For example, the clear aperture (the diameter) of the first lens face 111 can be within a range of 10 to 25 millimeters. For example, any one of the following values can be selected as the clear aperture of the first lens face 111: 11.78 millimeters, 14.21 millimeters, 18.38 millimeters, 21.56 millimeters and 24.87 millimeters. For example, a clear aperture (a diameter) of the second lens face 112 can be within a range of 10 to 25 millimeters. For example, any one of the following values can be selected as the clear aperture of the second lens face 112: 11.783 millimeters, 13.354 millimeters, 19.082 millimeters, 22.671 millimeters and 24.998 millimeters.

For example, an absolute value of a thickness (i.e., the spacing between the first lens face 111 and the micro-display 140) of the first lens face 111 is smaller than (much smaller than) an absolute value of a thickness (i.e., the spacing between the first lens face 111 and the second lens face 112) of the second lens face 112. For example, a ratio of the absolute value of the thickness of the second lens face 112 to the absolute value of the thickness of the first lens face 111 is within a range of 30 to 40 (for example, 35 to 38).

For example, the thickness of the first lens face 111 is within a range of −0.01 to −0.25 millimeter. For example, the thickness of the first lens face 111 can be about −0.03 millimeters, −0.108 millimeters, −0.21 millimeters or other applicable values. For example, the thickness (i.e., the spacing between the first lens face 111 and the second lens face 112) of the second lens face 112 is within the range of 2 to 5 millimeters (for example, 3 millimeters or 4 millimeters).

The optical path folding assembly 120 will be exemplarily illustrated below. As shown in FIG. 1 and FIG. 2, the optical path folding assembly 120 is configured to receive light of the first image shaped (for example, magnified) by the lens 110 and fold an optical path from the lens 110 to an exit pupil 101 of the near-eye display apparatus 100, and thus, the volume of the near-eye display apparatus 100 can be reduced, i.e., the near-eye display apparatus 100 is more compact.

For example, as shown in FIG. 1 and FIG. 2, the optical path folding assembly 120 includes a first transmission reflection element 121 and a second transmission reflection element 122 which are opposed in a second direction D2 intersecting with the first direction D1. For example, both the first transmission reflection element 121 and the second transmission reflection element 122 are partial-transmission partial-reflection elements. For example, the first transmission reflection element 121 can simultaneously reflect and transmit light incident to the first transmission reflection element 121, i.e., the first transmission reflection element 121 can reflect part of the light incident to the first transmission reflection element 121, and meanwhile, also can transmit part of the light incident to the first transmission reflection element 121. For example, reflectivity of both the first transmission reflection element 121 and the second transmission reflection element 122 is greater than or equal to 50%.

For example, as shown in FIG. 1 and FIG. 2, the light (i.e., the light of the first image shaped by the lens 110) of the first image can be sequentially reflected by the first transmission reflection element 121, reflected by the second transmission reflection element 122 and transmitted by the first transmission reflection element 121, i.e., the light (i.e., the light of the first image shaped by the lens 110) of the first image is sequentially incident to the first transmission reflection element 121, the second transmission reflection element 122 and the first transmission reflection element 121.

As shown in FIG. 1 and FIG. 2, a transmission path of the light (the light of the first image shaped by the lens 110 and used for imaging) of the first image is described as follows. Firstly, the light of the first image is incident to the first transmission reflection element 121 and is reflected by the first transmission reflection element 121; then, the light of the first image is incident to the second transmission reflection element 122 and is reflected by the second transmission reflection element 122; and then the light of the first image is incident to the first transmission reflection element 121, and after passing through the first transmission reflection element 121, leaves from the optical path folding assembly 120 and the near-eye display apparatus 100.

It should be noted that in order to facilitate description, in the example as shown in FIG. 1 and other examples of the embodiments of the present disclosure, the light incident to the second transmission reflection element 122 and the light reflected by the second transmission reflection element 122 are staggered mutually in the first direction D1, but in practice, for the same light, the light incident to the second transmission reflection element 122 and the light reflected by the second transmission reflection element 122 coincide with each other in the first direction D1.

For example, both the first transmission reflection element 121 and the second transmission reflection element 122 are face-shaped (plane or curved surface) transmission reflection elements, and in this case, the first transmission reflection element 121 and the second transmission reflection element 122 can form a hollow optical cavity, so that weights of the optical path folding assembly 120 and the near-eye display apparatus 100 can be reduced, and user experience is improved.

For example, as shown in FIG. 1 and FIG. 2, the first transmission reflection element 121 is a specular transmission reflection element, a working surface of the first transmission reflection element 121 is a plane, and for example, the first transmission reflection element 121 is of a flat plate shape; and in this case, the curvature radius of the first transmission reflection element 121 is infinitely great. For example, an included angle between the specular reflection surface of the first transmission reflection element 121 and the first direction D1 is equal to 45 degrees. For example, a production material of the related partial-transmission partial-reflection element or lens can be selected to produce the first transmission reflection element 121. For example, the first transmission reflection element 121 can include a plurality of layers of dielectric films. For example, the clear aperture (the diameter) of the first transmission reflection element 121 is within a range of 25 millimeters to 35 millimeters, and the clear aperture of the first transmission reflection element 121, for example, is about 26.42 millimeters, 31.63 millimeters or 34.18 millimeters.

For example, as shown in FIG. 1 and FIG. 2, the second transmission reflection element 122 is a curved transmission reflection element, so that the second transmission reflection element 122 can provide focal power and can be used for cooperating with the lens 110 to shape the first image, and thus, a shaping ability and a shaping effect of the composite structure of the lens 110 and the optical path folding assembly 120 for the first image can be promoted. For example, the second transmission reflection element 122 can be a spherical transmission reflection element or an aspheric transmission reflection element.

For example, as shown in FIG. 1 and FIG. 2, a curved surface of the second transmission reflection element 122, which faces the exit pupil 101 of the near-eye display apparatus 100, is a concave curved surface. For example, a primary optical axis of the second transmission reflection element 122 is in parallel with the second direction D2. For example, the first direction is perpendicular to the second direction D2, i.e., the primary optical axis of the lens 110 and the primary optical axis of the second transmission reflection element 122 are perpendicular to each other. For example, a production material of the related partial-transmission partial-reflection element or lens can be selected to produce the second transmission reflection element 122. For example, the second transmission reflection element 122 can include a plurality of layers of dielectric films.

For example, as shown in FIG. 1 and FIG. 2, the absolute value of the curvature radius of the second transmission reflection element 122 is smaller than the curvature radius of the first lens face 111, and the absolute value of the curvature radius of the second transmission reflection element 122 is smaller than the curvature radius of the second lens face 112. For example, the absolute value of the thickness of the second transmission reflection element 122 is greater than the absolute value of the thickness of the first lens face 111 and is greater than the absolute value of the thickness of the second lens face 112. For example, the clear aperture of the second transmission reflection element 122 is greater than the clear apertures of the first lens face 111 and the second lens face 112, and the clear aperture of the second transmission reflection element 122 is smaller than the clear aperture of the first transmission reflection element 121.

For example, the curvature radius of the second transmission reflection element 122 is within a range of −45 millimeters to −35 millimeters. For example, the curvature radius of the second transmission reflection element 122 is about −43.162 millimeters, −40.828 millimeters or −36.176 millimeters. For example, the thickness (i.e., a distance between the second transmission reflection element 122 and the first transmission reflection element 121, or a spacing between an intersection of the primary optical axis of the second transmission reflection element 122 and the second transmission reflection element 122 and an intersection of the primary optical axis of the second transmission reflection element 122 and the first transmission reflection element 121) of the second transmission reflection element 122 is within a range of −15 millimeters to −5 millimeters. For example, the thickness of the second transmission reflection element 122 is about −14.158 millimeters, −9.392 millimeters, −6.783 millimeters or −5.012 millimeters. For example, the clear aperture (the diameter) of the second transmission reflection element 122 is within a range of 25 millimeters to 30 millimeters. For example, the clear aperture of the second transmission reflection element 122 is about 27.546 or 28.174.

For example, a spacing (a spacing between an intersection of the primary optical axis of the lens 110 and the second lens face 112 and an intersection of the primary optical axis of the lens 110 and the first transmission reflection element 121) between the second lens face 112 and the first transmission reflection element 121 is smaller than the distance between the second transmission reflection element 122 and the first transmission reflection element 121. For example, the spacing between the second lens face 112 and the first transmission reflection element 121 is within a range of 5 millimeters to 15 millimeters. For example, the spacing between the second lens face 112 and the first transmission reflection element 121 is about 5.143 millimeters, 8.304 millimeters, 9.836 millimeters or 13.153 millimeters.

For example, a diameter of the exit pupil 101 of the near-eye display apparatus 100 can be within a range of 3 millimeters to 5 millimeters (for example, 4 millimeters). For example, an exit pupil position (or an exit pupil distance) of the near-eye display apparatus 100 can be positioned in a range of 15 millimeters to 30 millimeters (for example, 16.384 millimeters, 22.465 millimeters or 28.021 millimeters). It should be noted that the exit pupil position of the near-eye display apparatus 100 refers to a distance (for example, a distance along the primary optical axis of the second transmission reflection element 122) between the last optical surface (i.e., the first transmission reflection element 121) of the near-eye display apparatus 100 and the exit pupil 101 of the near-eye display apparatus 100.

For example, the composite structure of the lens 110 and the optical path folding assembly 120 can be called as the turn-back type optical system, and the turn-back type optical system can be a coaxial turn-back type optical system, i.e., the primary optical axis of the lens 110 intersects with the primary optical axis of the second transmission reflection element 122 on the specular reflection surface of the first transmission reflection element 121. For example, by enabling the composite structure of the lens 110 and the optical path folding assembly 120 to be the coaxial turn-back type optical system, the image quality of the image displayed by the near-eye display apparatus 100 can be ensured. For example, the coaxial turn-back type optical system further has at least one of the advantages of lightness and thinness, large viewing angle and low cost. For example, the specific structure and technical effects of the coaxial turn-back type optical system can refer to the related arts, and are not repeated herein.

In order to facilitate description, an intersection of the primary optical axis of the lens 110 and the primary optical axis of the second transmission reflection element 122 can be marked as a first intersection.

For example, in the process of optimizing the turn-back type optical system, in the case of ensuring that the user can observe the complete first image at the exit pupil 101, a length of the primary optical axis of the second transmission reflection element 122 between a vertex of the second transmission reflection element 122 and the first intersection can be made as small as possible so as to make the size of the near-eye display apparatus 100 small enough. For example, the length of the primary optical axis of the second transmission reflection element 122 between the vertex of the second transmission reflection element 122 and the first intersection is configured to enable light emitted by pixels of the micro-display 140, which are the closest to the edge, to be sequentially incident to the first transmission reflection element 121, the second transmission reflection element 122 and the first transmission reflection element 121, then pass through the first transmission reflection element 121 and be incident to the exit pupil 101 of a near-eye display system, and in this case, the first image displayed by the micro-display 140 can be completely imaged at the exit pupil 101, i.e., the user can observe the complete first image at the exit pupil 101, so that user experience can be ensured. For example, as shown in FIG. 2, the length of the primary optical axis of the second transmission reflection element 122 between the vertex of the second transmission reflection element 122 and the first intersection is smaller than a length of the second lens face 112 of the lens 110 in the second direction D2.

Figure 4:
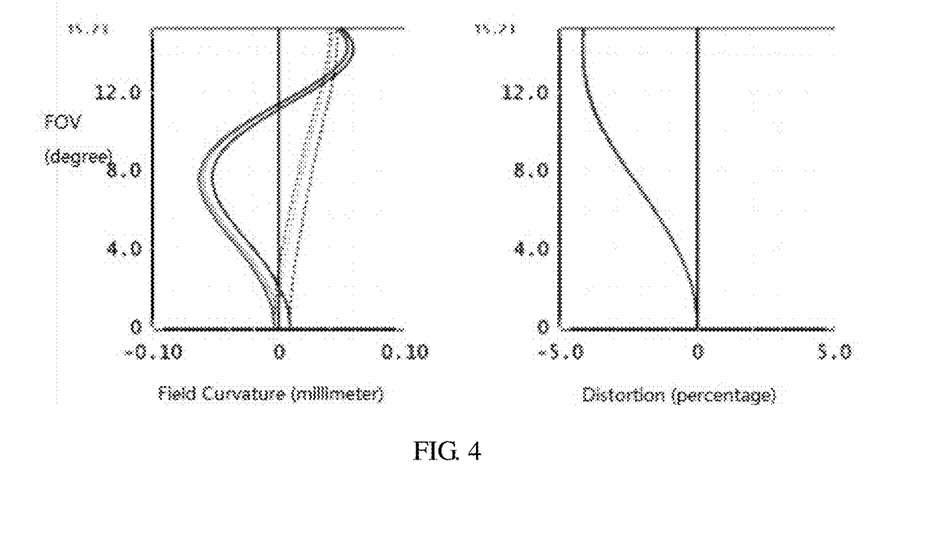
FIG. 4 is a schematic diagram of a field curvature and a distortion of the near-eye display apparatus shown in FIG. 1 and FIG. 2.

FIG. 4 shows a field curvature and a distortion of the near-eye display apparatus shown in FIG. 1 and FIG. 2. As shown in FIG. 4, when the FOV (half FOV) is smaller than 15 degrees, the field curvature of the near-eye display apparatus 100 shown in FIG. 1 and FIG. 2 is smaller than ±0.1 millimeter; and when the FOV (half FOV) is smaller than 15 degrees, the distortion of the near-eye display apparatus shown in FIG. 1 and FIG. 2 is a pillow distortion (correspondingly, a substrate takes a negative value), and a pillow distortion rate is smaller than 5%.

Figure 5:
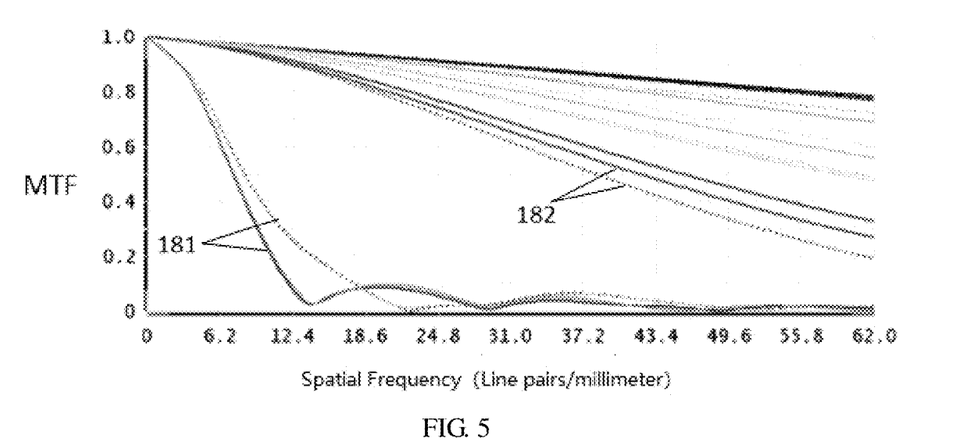
FIG. 5 is a schematic diagram of a Modulation Transfer Function (MTF) curve of the near-eye display apparatus shown in FIG. 1 and FIG. 2.

FIG. 5 shows an MTF curve of the near-eye display apparatus 100 shown in FIG. 1 and FIG. 2. As shown in FIG. 5, in a case that the FOV (half FOV) is 25 degrees, the MTF curve is shown as a curve 181; and in a case that the FOV (half FOV) is 23 degrees, the MTF curve is shown as a curve 182. As shown in FIG. 5, in the case that the FOV (half FOV) is 23 degrees, the user can distinguish information (for example, detail information) with a high spatial frequency (for example, 62 line pairs per millimeter) in the image displayed by the near-eye display apparatus 100; and in the case that the FOV (half FOV) is 25 degrees, the user cannot distinguish the information (for example, the detail information) with the high spatial frequency in the image displayed by the near-eye display apparatus 100 very well, but the user still can distinguish information (for example, profile information) with a low and medium spatial frequency in the image displayed by the near-eye display apparatus 100. Therefore, the FOV of the near-eye display apparatus 100 shown in FIG. 1 and FIG. 2 is greater than 50 degrees. For example, in a case that the demand on the volume of the near-eye display apparatus 100 is properly lowered, the FOV of the near-eye display apparatus 100 can be within a range of 50 degrees to 90 degrees, so that user experience can be promoted.

From the above, the image displayed by the near-eye display apparatus 100 provided by the embodiments of the present disclosure meets the demands of the user for the image quality.

In at least one example of the present disclosure, in the case of ensuring that the user can observe the complete first image at the exit pupil, the length of the primary optical axis of the second transmission reflection element between the vertex of the second transmission reflection element and the first intersection can be made as small as possible so as to make the size of the near-eye display apparatus small enough. Moreover, by adopting the bi-aspherical lens to promote the image quality of the near-eye display apparatus, in the case that the size of the near-eye display apparatus is small enough, the image displayed by the near-eye display apparatus can meet the demands of the user, so that comprehensive user experience can be promoted.

Figure 6:
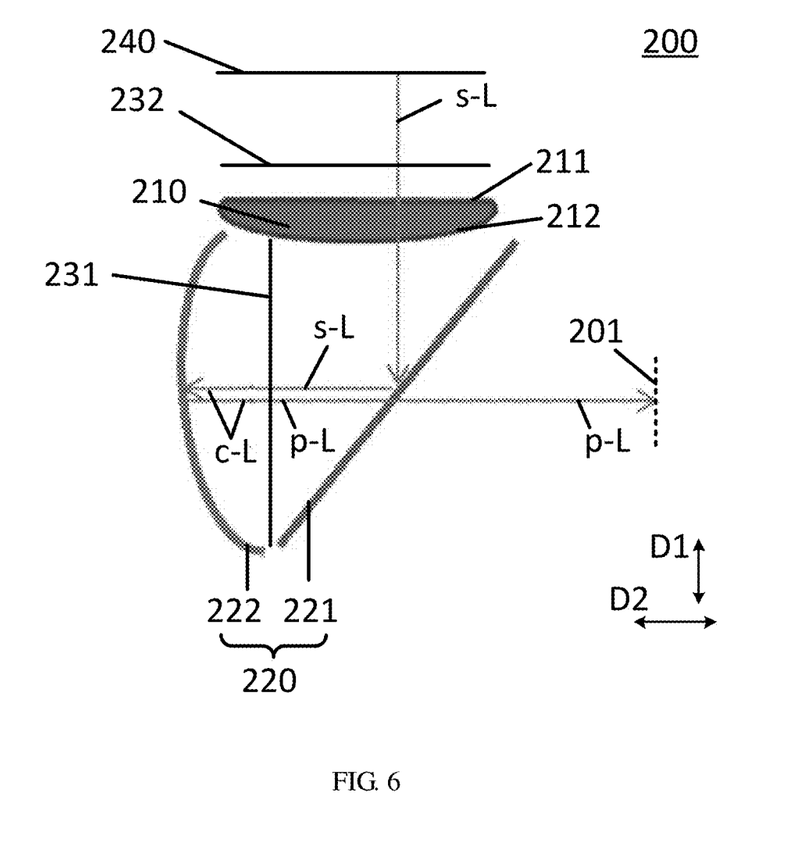
FIG. 6 is a structural schematic diagram of another near-eye display apparatus provided by at least one embodiment of the present disclosure.

FIG. 6 is a structural schematic diagram of another near-eye display apparatus 200 provided by at least one embodiment of the present disclosure, the near-eye display apparatus 200 shown in FIG. 6 can be implemented as monocular virtual reality glasses or binocular virtual reality glasses, and the near-eye display apparatus 200 shown in FIG. 6 also can be implemented as a virtual reality helmet or other applicable virtual reality display apparatuses.

As shown in FIG. 6, the near-eye display apparatus 200 includes a lens 210 and an optical path folding assembly 220. According to actual application demands, as shown in FIG. 6, the near-eye display apparatus 200 further includes a micro-display 240, a polarizer 232 and a quarter-wave plate 231. For example, a composite structure of the lens 210 and the optical path folding assembly 220 can be called as a turn-back type optical system.

As shown in FIG. 6, the lens 210 is configured to receive incident light of a first image, which is projected by the micro-display 240, and shape the first image (for example, magnify the first image). In some examples, the lens 210 is configured to magnify the first image into an image suitable for human eyes to observe; in some other examples, the lens 210 cooperates with the optical path folding assembly 220 mutually to magnify the first image into the image suitable for the human eyes to observe; and in yet some examples, the lens 210 is also configured to regulate a shape of the first image to make the image suitable for the human eyes to observer so as to reduce a distortion of the image.

As shown in FIG. 6, the lens 210 includes a primary optical axis (not shown) and a first lens face 211 and a second lens face 212 which are opposed in a first direction D1 where the primary optical axis of the lens 210 is positioned, and compared to the second lens face 212, the first lens face 211 is closer to the micro-display 240. As shown in FIG. 6, both the first lens face 211 and the second lens face 212 are aspheric surfaces (for example, even-order aspheric surfaces), i.e., the lens 210 provided by at least one embodiment of the present disclosure is a bi-aspherical lens 210. For example, a surface shape of the first lens face 211 and a surface shape of the second lens face 212 of the lens 210, a specific setting mode and technical effects can refer to the near-eye display apparatus 200 shown in FIG. 1 and FIG. 2, and are not repeated herein.

For example, by adopting the bi-aspherical lens 210 to promote image quality of the near-eye display apparatus 200, a volume of the near-eye display apparatus 200 can be reduced to the greatest extent by optimizing the optical path folding assembly 220, so that user experience can be promoted.

As shown in FIG. 6, the polarizer 232 is positioned on a light incident side of the lens 210 in the first direction D1 (i.e., positioned between the lens 210 and the micro-display 240 in the first direction D1), and is configured to enable polarized light emerging from the polarizer 232 to be s-polarized light (s-L). It should be noted that the polarizer 232 provided by at least one embodiment of the present disclosure also can be positioned on a light emergent side of the lens 210 in the first direction D1 (i.e., positioned on one side of the lens 210, which is away from the micro-display 240, in the first direction D1).

As shown in FIG. 6, the optical path folding assembly 220 is configured to receive light of the first image shaped by the lens 210 and fold an optical path from the lens 210 to an exit pupil 201 of the near-eye display apparatus 200. For example, as shown in FIG. 6, the optical path folding assembly 220 includes a first transmission reflection element 221 and a second transmission reflection element 222 which are opposed in a second direction D2 intersecting with the first direction D1.

For example, the first transmission reflection element 221 is a polarization beam splitting element, and the polarization beam splitting element has high reflectivity (for example, the reflectivity is greater than 90% and for example, is 100%) for the s-polarized light, and has high transmittance (for example, the transmittance is greater than 90% and for example, is 100%) for p-polarized light.

For example, the polarization beam splitting element is of a flat plate shape, so that the first transmission reflection element 221 and the second transmission reflection element 222 can form a hollow optical cavity, and thus, weights of the optical path folding assembly 220 and the near-eye display apparatus 200 can be reduced, and user experience can be improved.

For example, as shown in FIG. 1 and FIG. 2, the second transmission reflection element 222 is a curved transmission reflection element (for example, a spherical transmission reflection element or a non-curved transmission reflection element), so that the second transmission reflection element 222 also can provide focal power and can be used for cooperating with the lens 210 to shape the first image, and thus, a shaping ability and a shaping effect of the composite structure of the lens 210 and the optical path folding assembly 220 for the first image can be promoted.

For example, as shown in FIG. 1 and FIG. 2, a curved surface of the second transmission reflection element 222, which faces the exit pupil 201 of the near-eye display apparatus 200, is a concave curved surface. For example, a primary optical axis of the second transmission reflection element 222 is in parallel with the second direction D2. For example, the first direction D1 is perpendicular to the second direction D2, i.e., the primary optical axis of the lens 210 and the primary optical axis of the second transmission reflection element 222 are perpendicular to each other. For example, a production material of a related partial-transmission partial-reflection element or lens can be selected to produce the second transmission reflection element 222. For example, the second transmission reflection element 222 can include a plurality of layers of dielectric films.

As shown in FIG. 6, the quarter-wave plate 231 is arranged between the first transmission reflection element 221 and the second transmission reflection element 222 in the second direction D2, and the light of the first image is sequentially reflected by the first transmission reflection element 221, transmitted by the quarter-wave plate 231, reflected by the second transmission reflection element 222, transmitted by the quarter-wave plate 231 and transmitted by the first transmission reflection element 221.

As shown in FIG. 6, a transmission path of the light (the light of the first image for imaging) of the first image is described as follows. Firstly, the light (the s-polarized light s-L) of the first image is incident to the first transmission reflection element 221 and is reflected by the first transmission reflection element 221; then, the light of the first image is incident to the quarter-wave plate 231 and passes through the quarter-wave plate 231, and the quarter-wave plate 231 converts the light of the first image into circularly polarized light c-L from the s-polarized light s-L; then, the light (the circularly polarized light c-L) of the first image is incident to the second transmission reflection element 222, and is reflected by the second transmission reflection element 222; fourthly, the light (the circularly polarized light c-L) of the first image is incident to the quarter-wave plate 231 and passes through the quarter-wave plate 231, and the quarter-wave plate 231 converts the light of the first image into the p-polarized light p-L from the circularly polarized light c-L; and fifthly, the light (the p-polarized light p-L) of the first image is incident to the first transmission reflection element 221 and is transmitted by the first transmission reflection element 221, and the light of the first image leaves from the optical path folding assembly 220 and the near-eye display apparatus 200 after passing through the first transmission reflection element 221

For example, a light utilization efficiency $\eta 1$ of the near-eye display apparatus 200 shown in FIG. 6 can be represented by an expression as follows: $\eta 1 = \tau 1 \times \eta 11 \times f 12 \times \eta 13$, where $\tau 1$ represents transmittance of the polarizer 232 for the light incident to the polarizer 232; $\eta 11$ represents reflectivity of the first transmission reflection element 221 for the light of the first image, which is incident to the first transmission reflection element 221; $\eta 12$ represents reflectivity of the second transmission reflection element 222 for the light of the first image, which is incident to the second transmission reflection element 222; and $\eta 13$ represents transmittance of the first transmission reflection element 221 for the light of the first image, which is incident to the first transmission reflection element 221. For example, according to properties of the polarization beam splitting element and the polarizer 232, it can be known that: $\tau 1 = 50\%$; $\eta 11 = 100\%$; and $\eta 13 = 100\%$. In the case of assuming that $\eta 12 = 50\%$, $\eta 1 = 50\% \times 100\% \times 50\% \times 100\% = 25\%$. For example, in the case of promoting the reflectivity $\eta 12$ of the second transmission reflection element 222 for the light of the first image, which is incident to the second transmission reflection element 222, the light utilization efficiency $\eta 1$ of the near-eye display apparatus 200 can be promoted to 30%.

For example, a light utilization efficiency $\eta 2$ of the near-eye display apparatus 200 shown in FIG. 1 and FIG. 2 can be represented by an expression as follows: $\eta 2 = \eta 21 \times \eta 22 \times \eta 23$, where $\eta 21$ represents reflectivity of the first transmission reflection element 221 for the light of the first image, which is incident to the first transmission reflection element 221; $\eta 22$ represents reflectivity of the second transmission reflection element 222 for the light of the first image, which is incident to the second transmission reflection element 222; and $\eta 23$ represents transmittance of the first transmission reflection element 221 for the light of the first image, which is incident to the first transmission reflection element 221. For example, in the case of assuming that both the first transmission reflection element 221 and the second transmission reflection element 222 are semi-transmission semi-reflection elements, η21, η22 and η23 are all equal to 50%. Therefore, η2=50%×50%×50%=12.5%. For example, in order to promote the light utilization rate η12 of the near-eye display apparatus 200 shown in FIG. 1 and FIG. 2, in the case of ensuring that the user can observe an outside scene through the near-eye display apparatus 200, the reflectivity of the first transmission reflection element 221 and the second transmission reflection element 222 can be properly promoted, and even so, the light utilization rate η12 of the near-eye display apparatus 200 may be difficult to exceed 20%.

From the above, compared to the near-eye display apparatus 200 shown in FIG. 1 and FIG. 2, the near-eye display apparatus 200 shown in FIG. 6 is promoted in light utilization efficiency, and thus, power consumption and endurance time of the near-eye display apparatus 200 can be reduced, so that user experience can be promoted.

Figure 7:
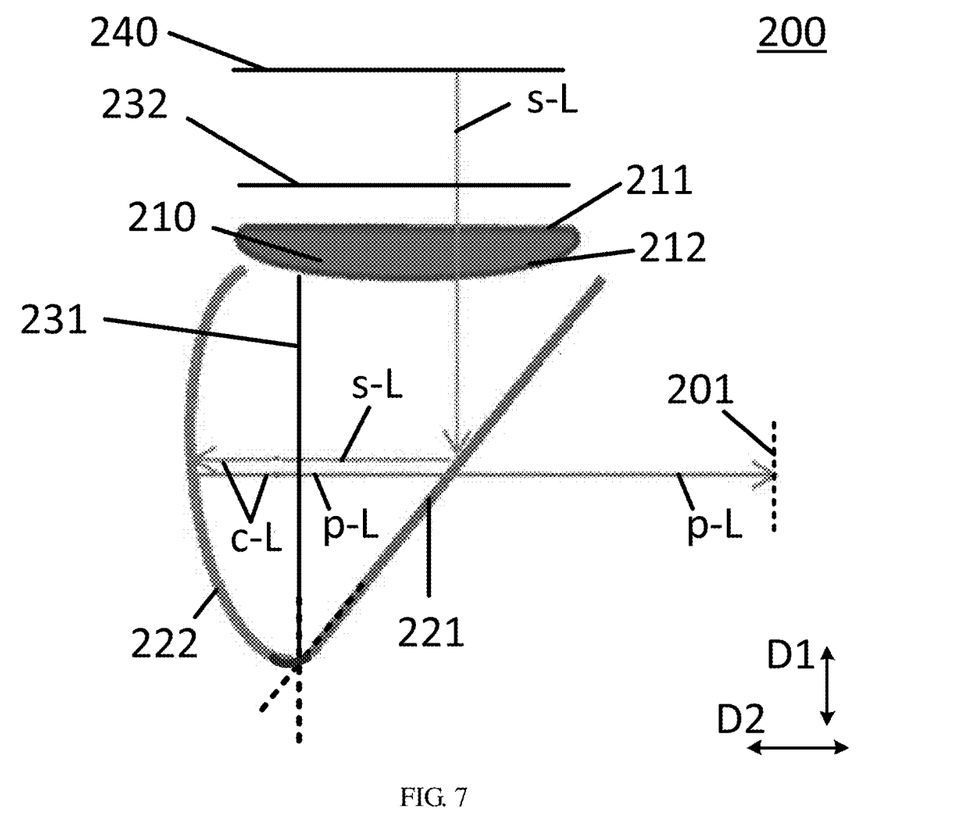
FIG. 7 is another structural schematic diagram of another near-eye display apparatus provided by at least one embodiment of the present disclosure.

FIG. 7 is another structural schematic diagram of another near-eye display apparatus provided by at least one embodiment of the present disclosure. As shown in FIG. 7, an intersection of an extension line of the first transmission reflection element 221 and an extension line of the second transmission reflection element 222 is positioned in a plane where the quarter-wave plate 231 is positioned, so that a clear aperture of the quarter-wave plate 231 can be made as great as possible, and thus, the light utilization efficiency of the near-eye display apparatus 200 shown in FIG. 6 and FIG. 7 can be further improved.

For example, the composite structure of the lens 210 and the optical path folding assembly 220 can be called as the turn-back type optical system and can be a coaxial turn-back type optical system, i.e., the primary optical axis of the lens 210 intersects with the primary optical axis of the second transmission reflection element 222 on a specular reflection surface of the first transmission reflection element 221. In order to facilitate description, an intersection of the primary optical axis of the lens 210 and the primary optical axis of the second transmission reflection element 222 can be marked as a first intersection.

For example, in the process of optimizing the turn-back type optical system, in the case of ensuring that the user can observe the complete first image at the exit pupil 201, a length of the primary optical axis of the second transmission reflection element 222 between a vertex of the second transmission reflection element 222 and the first intersection can be made as small as possible so as to make the size of the near-eye display apparatus 200 small enough. For example, as shown in FIG. 6, the length of the primary optical axis of the second transmission reflection element 222 between the vertex of the second transmission reflection element 222 and the first intersection is smaller than a length of the second lens face 212 of the lens 210 in the second direction D2.

Several Points Below should be Noted:

(1) In at least one embodiment of the present disclosure, the light utilization efficiency of the near-eye display apparatus refers to a ratio of light intensity of the light which leaves the optical path folding assembly and the near-eye display apparatus via the first transmission reflection element to light intensity of the light emitted by the micro-display.

(2) In consideration of a case that absorption of the quarter-wave plate for the light can be ignored, in the process of calculating the light utilization efficiency ill of the near-eye display apparatus shown in FIG. 6, it is assumed that the transmittance of the quarter-wave plate for the light of the first image is 100%.

(3) In a case that the clear aperture of the quarter-wave plate meets application demands, the intersection of the extension line of the first transmission reflection element and the extension line of the second transmission reflection element also can be disposed at an interval with the plane where the quarter-wave plate is positioned (disposed at an interval in the second direction D2).

(4) In a case that the micro-display emits the s-polarized light, the polarizer also may be not arranged for the near-eye display apparatus.

(5) The volume and the appearance shape of the near-eye display apparatus shown in FIG. 6 can be the same and similar with the volume and the appearance of the near-eye display apparatus shown in FIG. 1 and FIG. 2.

(6) For clarity, in the embodiments of the near-eye display apparatus shown in FIG. 6, differences of the near-eye display apparatus shown in FIG. 6 from the near-eye display apparatus shown in FIG. 1 and FIG. 2 are mainly illustrated, and the similarities can refer to the embodiments of the near-eye display apparatus shown in FIG. 1 and FIG. 2.

In at least one example of the present disclosure, in the case of ensuring that the user can observe the complete first image at the exit pupil, the length of the primary optical axis of the second transmission reflection element between the vertex of the second transmission reflection element and the first intersection can be made as small as possible so as to make the size of the near-eye display apparatus small enough. Moreover, by adopting the bi-aspherical lens to promote the image quality of the near-eye display apparatus, in the case that the size of the near-eye display apparatus is small enough, the image displayed by the near-eye display apparatus can meet the demands of the user, so that comprehensive user experience can be promoted. Moreover, by using the quarter-wave plate and the polarization beam splitting element, the light utilization efficiency of the near-eye display apparatus can be promoted, so that the power consumption and the endurance time of the near-eye display apparatus can be reduced, and user experience can be further promoted.

Figure 8:
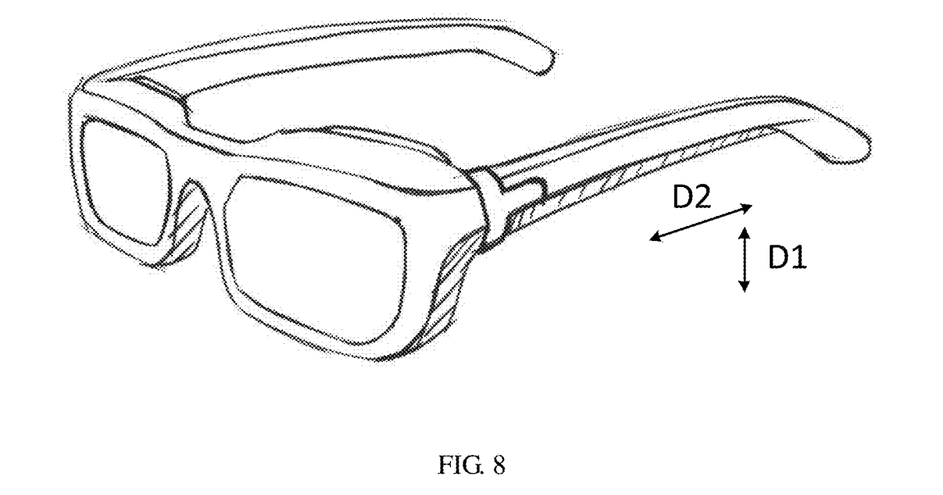
FIG. 8 is binocular virtual reality glasses provided by at least one embodiment of the present disclosure.

FIG. 8 shows binocular virtual reality glasses provided by at least one embodiment of the present disclosure. For example, the near-eye display apparatus provided by the embodiments of the present disclosure can be implemented as the binocular virtual reality glasses shown in FIG. 8. For example, as shown in FIG. 2 and FIG. 8, the lens and the micro-display can be arranged in an upper region of the virtual reality glasses, and compared to the second transmission reflection element, the first transmission reflection element is closer to eyes of the user.

For example, according to the near-eye display apparatus provided by at least one embodiment of the present disclosure, at least one of the volume, the weight and the power consumption of the near-eye display apparatus is reduced and the light utilization rate of the near-eye display apparatus can be promoted, and thus, the near-eye display apparatus and the binocular virtual reality glasses provided by at least one embodiment of the present disclosure are suitable to wear in daily life.

Although detailed description has been given above to the present disclosure with general description and embodiments, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

What are described above is related to the illustrative embodiments of the disclosure only and not limitative to the scope of the disclosure; the scopes of the disclosure are defined by the accompanying claims.

What is claimed is:

1. An optical device, comprising a lens and an optical path folding assembly,
wherein the lens is configured to receive incident light of a first image and shape the first image, and the incident light is projected by a micro-display,
the lens comprises a primary optical axis, a first lens face and a second lens face, and the first lens face and the second lens face are opposed in a first direction where the primary optical axis of the lens is positioned, wherein a curvature radius of the first lens face is within a range of 70 to 100 millimeters, and a curvature radius of the second lens face is within a range of 10 to 30 millimeters; and
the optical path folding assembly is configured to receive light of the first image shaped by the lens and fold an optical path from the lens to an exit pupil of the optical device.

2. The optical device according to claim 1, wherein both the first lens face and the second lens face are aspheric surfaces.

3. The optical device according to claim 1, wherein the optical path folding assembly comprises a first transmission reflection element and a second transmission reflection element which are opposed in a second direction intersecting with the first direction, the light of the first image is sequentially reflected by the first transmission reflection element, reflected by the second transmission reflection element, and transmitted by the first transmission reflection element.

4. The optical device according to claim 3, wherein the first transmission reflection element is a specular transmission reflection element.

5. The optical device according to claim 3, wherein the second transmission reflection element is a curved transmission reflection element, and a curved surface of the second transmission reflection element, which faces the exit pupil of the optical device, is a concave curved surface.

6. The optical device according to claim 3, wherein a primary optical axis of the second transmission reflection element is in parallel with the second direction;
the primary optical axis of the lens intersects with the primary optical axis of the second transmission reflection element on a specular reflection surface of the first transmission reflection element; and
an included angle between the specular reflection surface of the first transmission reflection element and the first direction is equal to 45 degrees.

7. The optical device according to claim 3, wherein the first transmission reflection element is a polarization beam splitting element.

8. The optical device according to claim 7, further comprising a quarter-wave plate, wherein the quarter-wave plate is arranged between the first transmission reflection element and the second transmission reflection element in the second direction, and the light of the first image is sequentially reflected by the first transmission reflection element, transmitted by the quarter-wave plate, reflected by the second transmission reflection element, transmitted by the quarter-wave plate, and transmitted by the first transmission reflection element.

9. The optical device according to claim 8, wherein the first direction is perpendicular to the second direction, and the second direction is perpendicular to the quarter-wave plate.

10. The optical device according to claim 8, wherein an intersection of an extension line of the first transmission reflection element and an extension line of the second transmission reflection element is positioned in a plane where the quarter-wave plate is positioned.

11. The optical device according to claim 7, further comprising:
a polarizer, which is positioned on a light incident side or a light emergent side of the lens in the first direction, wherein the polarizer is configured to enable polarized light emerging from the polarizer to be s-polarized light; and
the polarization beam splitting element is configured to reflect the s-polarized light.

12. The optical device according to claim 3, wherein reflectivity of the first transmission reflection element and reflectivity of the second transmission reflection element are greater than or equal to 50%.

13. The optical device according to claim 2, wherein the first lens face is arranged between the second lens face and the micro-display in the first direction.

14. The optical device according to claim 13, wherein both the first lens face and the second lens face are even-order aspheric surfaces;
a surface shape z of the first lens face of the lens meets an expression (1) as follows:

$$z1 = \frac{c1 \times r1^2}{1 + \sqrt{1 - (1+k1) \times c1 \times r1^2}} + a11 \times r1^2 + a12 \times r1^4 + a13 \times r1^6 + a14 \times r1^8 + a15 \times r1^{10}, ; \quad (1)$$

a surface shape z of the second lens face of the lens meets an expression (2) as follows:

$$z2 = \frac{c2 \times r2^2}{1 + \sqrt{1 - (1+k2) \times c2 \times r2^2}} + a21 \times r2^2 + a22 \times r2^4 + a23 \times r2^6 + a24 \times r2^8 + a25 \times r2^{10}, ; \quad (2)$$

z1 represents an axial spacing of any one random point on the first lens face with respect to a tangent plane of a vertex of the first lens face; r1 represents a radial distance of any one random point on the first lens face with respect to the primary optical axis of the lens; c1 represents a curvature of the first lens face, and k1 represents a cone coefficient of the first lens face; a11, a12, a13, a14 and a15 respectively represent a second-order aspheric coefficient, a fourth-order aspheric coefficient, a sixth-order aspheric coefficient, an eighth-order aspheric coefficient and a tenth-order aspheric coefficient of the first lens face; and
z2 represents an axial spacing of any one random point on the second lens face with respect to a tangent plane of a vertex of the second lens face; r2 represents a radial distance of any one random point on the second lens face with respect to the primary optical axis of the lens; c2 represents a curvature of the second lens face, and k2 represents a cone coefficient of the second lens face; and a21, a22, a23, a24 and a25 respectively represent a second-order aspheric coefficient, a fourth-order aspheric coefficient, a sixth-order aspheric coefficient, an eighth-order aspheric coefficient and a tenth-order aspheric coefficient of the second lens face.

15. The optical device according to claim 14, wherein a11, a12, a13, a14 and a15 respectively meet ranges as follows:
   $-0.9 \times 10^{-4} < a11 < 1 \times 10^{-4}$
   $-10 \times 10^{-3} < a12 < -1 \times 10^{-3}$
   $1 \times 10^{-5} < a13 < 10 \times 10^{-5}$
   $-10 \times 10^{-9} < a14 < -1 \times 10^{-9}$
   $-10 \times 10^{-10} < a15 < -1 \times 10^{-10}$; and
   a21, a22, a23, a24 and a25 respectively meet ranges as below:
   $-0.9 \times 10^{-4} < a21 < 1 \times 10^{-4}$
   $1 \times 10^{-4} < a22 < 10 \times 10^{-4}$
   $-10 \times 10^{-6} < a23 < -1 \times 10^{-6}$
   $-10 \times 10^{-7} < a24 < -1 \times 10^{-7}$
   $1 \times 10^{-10} < a25 < 10 \times 10^{-10}$.

16. A near-eye display apparatus, comprising an optical device, wherein the optical device comprises a lens and an optical path folding assembly,
   the lens is configured to receive incident light of a first image and shape the first image, and the incident light is projected by a micro-display,
   the lens comprises a primary optical axis, a first lens face and a second lens face, and the first lens face and the second lens face are opposed in a first direction where the primary optical axis of the lens is positioned,
   wherein a curvature radius of the first lens face is within a range of 70 to 100 millimeters, and a curvature radius of the second lens face is within a range of 10 to 30 millimeters; and
   the optical path folding assembly is configured to receive light of the first image shaped by the lens and fold an optical path from the lens to an exit pupil of the near-eye display apparatus.

17. The near-eye display apparatus according to claim 16, further comprising the micro-display, wherein the micro-display is configured to project the incident light of the first image towards the lens.

18. The near-eye display apparatus according to claim 16, wherein both the first lens face and the second lens face are aspheric surfaces.

19. The near-eye display apparatus according to claim 16, wherein the optical path folding assembly comprises a first transmission reflection element and a second transmission reflection element which are opposed in a second direction intersecting with the first direction, the light of the first image is sequentially reflected by the first transmission reflection element, reflected by the second transmission reflection element, and transmitted by the first transmission reflection element.

20. The near-eye display apparatus according to claim 19, wherein the first transmission reflection element is a specular transmission reflection element.

* * * * *